INVENTORS
HORST E. GREVE
HANNS HORNSCHUCH
THEIR ATTORNEY

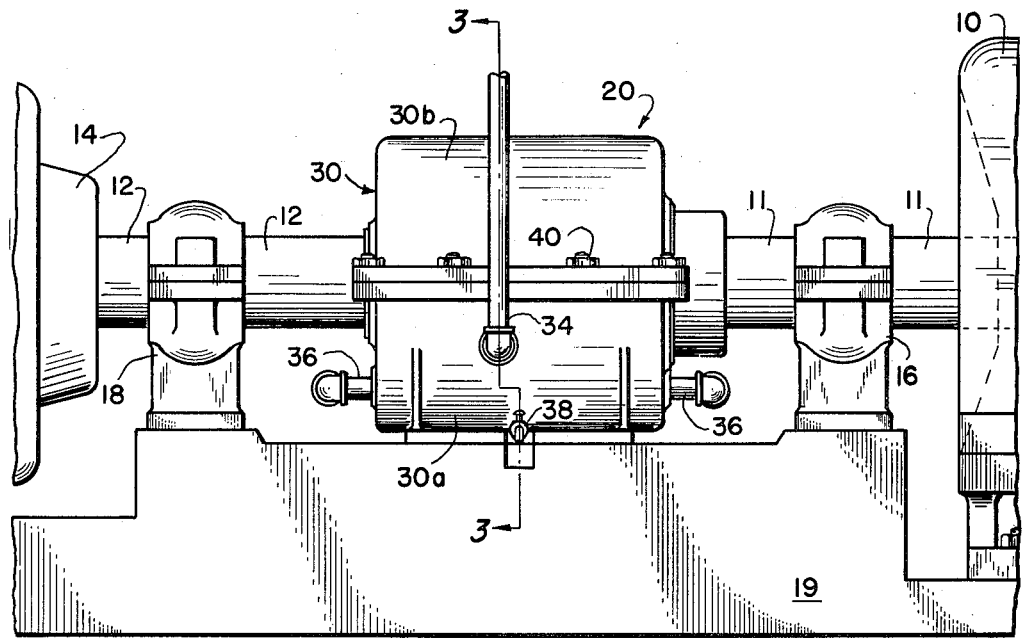

INVENTORS
HORST E. GREVE
HANNS HORNSCHUCH
THEIR ATTORNEY

United States Patent Office 3,193,068
Patented July 6, 1965

3,193,068
TEMPERATURE-RESPONSIVE COUPLING MEANS
Horst E. Greve, Painted Post, N.Y., and Hanns Hornschuch, Easton, Pa., assignors to Ingersoll-Rand Company, New York, N.Y., a corporation of New Jersey
Filed Apr. 24, 1962, Ser. No. 189,912
11 Claims. (Cl. 192—82)

The present invention relates to an improved coupling means for connecting a driving means to a driven means and more particularly to an improved coupling means for blowers, compressors and pumps.

Heretofore teeth or gears have been employed to connect the driving shaft of a driving means to a driven shaft of the driven means, such as a blower, compressor, or pump. With the use of such a connection, it is virtually impossible to disconnect the driving shaft from the driven shaft while the driving means is in operation since as the teeth or gears are disconnected the impacting of the disconnecting gears or teeth often causes breaking or chipping therein. In the case where friction discs are utilized to make the connection, retraction of one of the sets of the friction discs results in considerable wear thereon. Another type of conventional coupling means, a hyddraulic coupling means, is rather masive, expensive and difficult to uncouple unless the driving means is stationary.

Where a series of blowers or compressors or pumps are connected in series and it is not desirable to stop the driving means when one of the blowers or compressors or pumps fails, these conventional types of coupling means are inadequate because of the above-mentioned breakage, wear and the necessity of stopping the driving means.

The above-mentioned conventional coupling means and other coupling means are of the type shown in—

U.S. Patent 1,694,242—issued December 4, 1928 to A. W. Wheaton, Jr.;
U.S. Patent 2,333,370—issued November 2, 1943 to S. W. Graham;
U.S. Patent 2,727,371—issued December 20, 1955 to H. Troeger et al.;
U.S. Patent 2,862,375—issued December 2, 1958 to S. B. Miller;
U.S. Patent 2,910,846—issued November 3, 1959 to J. L. Butterfield et al.

and

Belgian Patent 508,542.

It is the general object of the present invention to avoid and overcome the foregoing and other difficulties of and objections to prior art practice by the provision of an improved coupling means which is adapted to permit disconnecting of the driven shaft of the driven means from the driving shaft of the driving means while the driving means continues to operate.

A further object of the present invention is the provision of an improved coupling means which is extremely efficient, rugged in construction (thus providing in effect one solid shaft between the driven shaft of the driven means and the driving shaft of the driving means), and which is relatively inexpensive to build and to maintain.

Another object of the present invention is the provision of an improved coupling means which is simple in structure but is relatively light in weight.

A still further object of the present invention is an improved coupling means which is readily adapted for use with a wide range of sizes of driven shafts and driving shafts.

Yet another object of the present invention is the provision of an improved coupling means which is simple to fabricate and easy to maintain.

The aforesaid objects of the present invention and other objects which will become apparent as the invention proceeds, are achieved by providing an improved coupling means for connecting a driven member of a driven means to a driving member of a driving means and comprising a first coupling member secured to one of the driven shaft and the driving shaft, a second coupling member disposed contiguous to the first coupling member to provide a securing cavity therebetween, low temperature securing means disposed in said cavity to secure the first coupling member to the second coupling member, housing means disposed about the first coupling member and the second coupling member to provide a heating cavity therebetween, and heating means connected to said housing means for heating the low temperature securing means at the desired time to cause the liquification thereof and to permit automatically the disconnecting of the first coupling from the second member while the driving member continues to operate.

For a better understanding of the present invention, reference should be made to accompanying drawings wherein like numerals of reference indicate several parts throughout the views and wherein:

FIG. 1 is a side elevational view of a driven shaft and a driving shaft with the improved coupling means disposed therebetween;

FIG. 2 is an enlarged fragmentary vertical sectional view of the driven shaft, driving shaft and the improved coupling means of the present invention;

FIG. 4 is a fragmentary view on an enlarged scale of the sealing means disposed at each end of the securing cavity;

Figure 3:
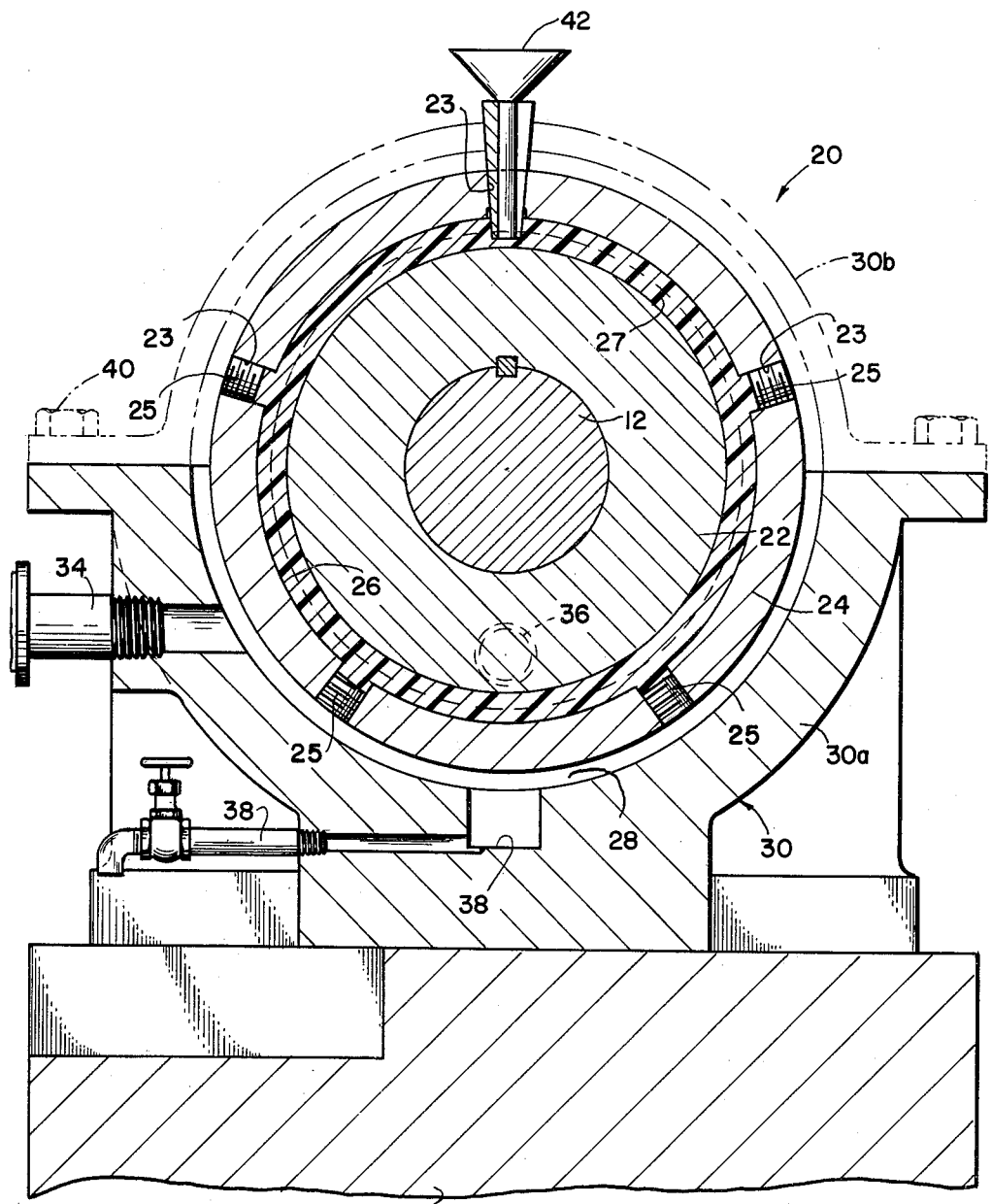
FIG. 3 is a sectional view along the line 3—3 of FIG. 1, on an enlarged scale showing the upper half of the housing removed and a filling funnel in position for introducing low temperature securing means into the securing cavity.

Although the principles of the present invention are broadly applicable to any driven means and driving means or to a series of driven means connected to a driving means, the present invention is particularly adapted for use in conjunction with blowers, compressors and pumps connected to a driving means, such as a motor, or to a series of such blowers, compressors and pumps connected to a driving means, such as a motor, and hence it has been so illustrated and will be so described.

With specific reference to the form of the present invention illustrated in the drawings, and referring particularly to FIG. 1, a driven member, such as a driven shaft of a pump 10, is indicated generally by the reference numeral 11. Shown in the lefthand portion of FIG. 1, is a driving member, such as a driving shaft 12 of a driving means, such as a motor 14. In order to support and align the driven shaft 11 and the driving shaft 12, bearings 16 and 18 are mounted on a frame 19. Disposed between the driven shaft 11 and the driving shaft 12 is an improved coupling means 20 of the present invention.

Referring now to FIG. 2, a first coupling member, such as a sleeve 22, is connected to one of either the driven member or the driving member, such as the driving shaft 12 by conventional means, such as welding, brazing, or a keyed or threaded connection therebetween. A second coupling member, such as a finned drum 24, is disposed contiguous to the first coupling member 22 and is connected to the other of the driven member and the driving member in this case the driven shaft 11. The drum 24 is disposed about the sleeve 22 and defines with the outer periphery of the sleeve 22, a securing cavity 26 (FIGS. 2 and 3). As best shown in FIG. 3 drum 24 is provided with a plurality of circumferentially spaced threaded openings 23 into each of which is turned a plug 25. Low temperature securing means 27, such as a low temperature melting metal or metal alloy, or thermoplastic, in a liquid state, may be introduced into the securing cavity 26 through one of the openings 23 after removal of a plug 25. After the securing means in a liquid state solidifies within cavity 26 it secures drum 24 to sleeve 22. For the purpose of providing a heating cavity 28 (FIGS. 2 and 3) about the drum 24, housing means, such as a housing 30 is disposed about the first coupling member 22 and the second coupling member 24. The stationary housing 30 is mounted on the frame 19 and is provided with a heating fluid inlet 34 (FIG. 1), a heating fluid outlet 36 (FIG. 1) and a drainage outlet 38 (FIGS. 1 and 3) (for the melted low temperature securing means) disposed in the bottom 30a of the housing 30 to permit the discharge of condensed liquids and melted metal sealing material from the housing 30.

Operation

For the purpose of preparing the assembly of the coupling means 20, a lower half 30a (as viewed in FIGS 1 and 3) of the housing 30 is positioned on the frame 19. In order to assemble the improved coupling means 20 the driving shaft 12 is connected to the sleeve 22, the driven shaft 11 is connected to the drum 24, the drum 24 is positioned about the sleeve 22 within the lower half 30a to define the securing cavity 26 and the driving shaft 11 and driven shaft 12 are positioned in the alignment bearings 16 and 18, respectively. A low temperature melting securing means, such as Wood's metal alloy, babbitt, lead, "Asarco" (a tradename for a metal menufactured by American Smelting and Refining Co.), or a thermoplastic, such as "Dylan" (the tradename of a material manufactured by Koppers Company, Inc.), is then introduced into the securing cavity 26 through an unplugged opening 23 (FIG. 3) in drum 24 by means of a funnel 42 inserted in the unplugged opening 23. To prevent longitudinal flow of such hot sealing fluid down into the clearance space between the drum 24 and sleeve 22 at each end of the securing cavity 26, a longitudinally disposed sealing means is provided at each end. As best shown in FIG. 4 each sealing means comprises an annular flexible seal 44 carried by an axially slidable ring 45 which ring 45 is reciprocable in an annular aperture 46 in the drum 24 by means of a plurality of adjustment bolts 47, each of which is insertable into the drum 24 and threadably secured to the ring 45. In order to bias the ring 45 and the flexible seal 44 into the forward sealing position, biasing means, such as springs 48, are disposed about each of the bolts 47. After the securing cavity 26 is filled, funnel 42 and plugs 25 are removed and the securing fluid 27 is allowed to cool and solidify. Following solidification of securing fluid 27 by means of which a firm bond is achieved between drum 24 and sleeve 22, flexible seals 44 are preferably retracted to the position shown by the lefthand flexible seal 44 as viewed in FIG. 2 by rotation of knob 39 on the threaded end 41 of bolt 47. Thereafter, an upper half 30b (FIGS. 1-3) of housing 30 is mounted on the lower half 30a about drum 24 and the upper half 30b and lower half 30a secured together by bolts 40.

In the event that the pump 10 fails in operation and it is necessary to disconnect the driven shaft 11 from the driving shaft 12 while the latter continues to rotate, such disconnection may be readily accomplished by use of a heating means which is disposed in operative relation with respect to the housing means 30 for introducing heat into the heating cavity 28 for transmission to the low temperature melting securing means 27 by radiation, convection and conduction to cause the melting thereof with attendant disconnecting of the driven shaft 11 from the driving shaft 12 while the driving shaft 12 continues to rotate. This result is accomplished by circulating the heating fluid through the heating cavity 28 by way of heating fluid inlet 34 and cooled heating fluid outlets 36. The heating fluid may be in the form of hot air, hot water or a plastic liquid, such as "Dowtherm" (a trade name for a liquid manufactured by Dow Chemical Co.) or an anti-freeze fluid, such as "Zerex" (a trade name for a liquid manufactured by E. I. du Pont de Nemours Co.). Circulation of such heating fluid in the heating cavity 28 causes heat from such heating fluid to be readily transmitted by fins 49 (FIG. 2) on the drum 24 (by means of radiation, convection and conduction) and thence to the low temperature melting securing means 27. The fins 49 provide a large surface area and rapidly transmit the heat through the thin walled drum 24 to the low temperature melting securing means 27 which means 27 rapidly reaches the liquid state and flows outwardly from securing cavity 26 through unplugged openings 23. Low temperature melting securing means 27, in a liquid state, is prevented from flowing into the clearance spaces between the drum 24 and sleeve 22 at the ends of the securing cavity 26 by the centrifugal force imparted to the liquid due to the continued rotation of the driving shaft 12 and sleeve 22 so that it is unnecessary to adjust the flexible seals 44 into sealing position prior to melting the low temperature melting securing means 27. The melted low temperature melting securing means 27 flows outwardly from the housing 30 through the discharge orifice 38, thus permitting the disconnecting of the driven shaft 10 from the driving shaft 12 while the latter continues to rotate.

Alternative embodiments

Figure 5:
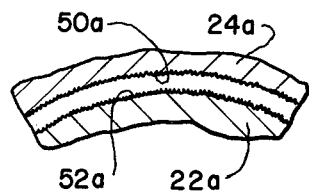
FIGS. 5-9 are fragmentary views of the drum and sleeve similar to FIG. 4 showing alternative embodiments of the juxtaposed peripheral surfaces of the drum and sleeve.

It will be recognzed by those skilled in the art that alternatively in order to more firmly secure the drum 24 to the sleeve 22 the adjacent surfaces 50a and 52a of a drum 24a and a sleeve 22a respectively, may be roughened as shown in FIG. 5.

Figure 6:
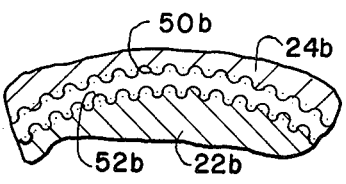
Figure 7:
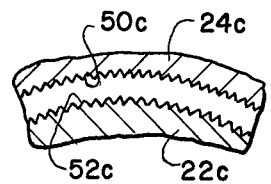
Figure 8:
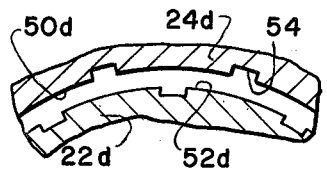
Figure 9:
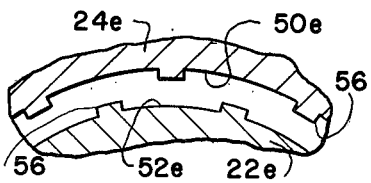

In FIG. 6 adjacent surfaces 50b and 52b are shown as corrugated surfaces whereas in FIG. 7, adjacent surfaces 50c and 52c are serrated surfaces. As shown in FIG. 8, such adjacent surfaces 50d and 52d are provided with longitudinal keying grooves 54 and in FIG. 9 adjacent surfaces 50e and 52e are provided with projections 56.

Figure 10:
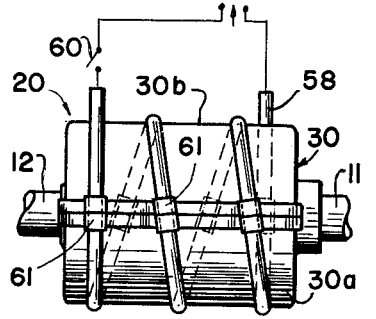
FIG. 10 is a side elevational view on a reduced scale and similar to FIG. 1 of an alternative embodiment of the heating means.

Referring to FIG. 10 it will be understood that the heating means may alternatively comprise an electrical heating coil 58, suitably electrically insulated from the housing 30, and connected through a switch 60 to a suitable voltage supply indicated by the legend "AC supply." Heating coil 58 may be provided with suitable quick disconnect couplings 61 to permit assembly and disassembly of the coil 58 about housing 30 and removal of upper portion 30b of housing 30.

Figure 10A:
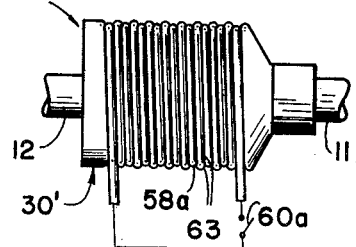
FIG. 10A is a side elevational view, similar to FIG. 10, of another embodiment of the heating means.

In FIG. 10a is shown an alternative electrical heating means wherein the helically wrapped electrical heating coil 58a lies within helically formed grooves 63 formed in the peripheral surface of housing 30' to thereby provide more intimate contact between the housing 30 and the heating coil 58a. The heating coil 58a is suitably electrically insulated from the housing 30' and is connected through a switch 60a to a source of electrical current, indicated by the legend "AC Supply."

Figure 12:
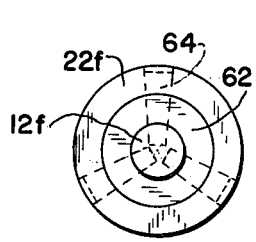
FIG. 12 is a view along the line 12—12 of FIG. 11 in the direction of the arrows.
Figure 11:
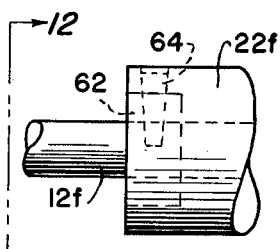
FIG. 11 is a fragmentary vertical sectional view of an alternative embodiment of the first and second coupling members.

For the purpose of adapting the sleeve 22 and drum 24 for attachment to a wide range of sizes of driven shaft 11 and driving shaft 12 respectively, a driving shaft 12f, as illustrated for example in FIGS. 11 and 12 may be secured by means of an adapter 62 and taper pins 64 to a sleeve 22f.

Further examples of low temperature melting metals are:

Tin
Compounds of lead, tin and antimony
Rose's metal alloy

Further examples of low temperature melting thermoplastics are:

Acetal resin, such as "Delrin" (a tradename for a material manufactured by E. I. du Pont de Nemours Co.)

Polyethylene resin, such as "Alathon" (a tradename for a material manufacturing by E. I. du Pont de Nemours Co.)

Polyamide resin, such as "Nylon" (a tradename for a material manufactured by E. I. du Pont de Nemours Co.)

"Tempilstiks," a tradename for a material manufactured by Tempil Corp.

Additional examples of a heating fluid are:

"Zerone" (a tradename for a material manufactured by E. I. du Pont de Nemours Co.)

"Prestone" (a tradename for a material manufactured by National Carbon Co.)

"Dicol" (a tradename for a material manufactured by Wyandotte Chemicals Co.)

Figure 13:
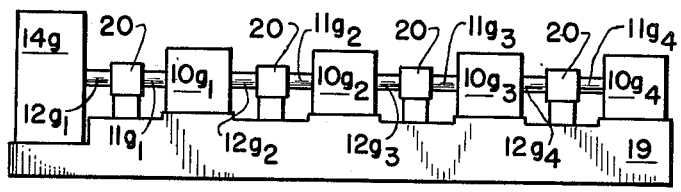
FIG. 13 is a diagrammatic plan view of a series of pumps connected by means of the improved coupling means to a drive means.

As shown in FIG. 13, the improved coupling means 20 may be utilized to connect a series of pumps 10g, 10g2, etc. to a motor 14g.

It will be recognized by those skilled in the art, that the objects of the present invention have been achieved by the provision of an improved coupling means which is readily adapted to permit the disconnecting of a driven member from a driving member while the latter continues to operate.

This improved coupling means is simple and rugged in structure, relatively light in weight, in inexpensive to build and maintain because of its few component parts, provides a longer operative life and is adapted for use with a large variety of sizes of driven members and driving members.

While in accordance of the patent statutes, one best known embodiment and alternative embodiments of the present invention has been described in detail, it is to be particularly understood that the invention is not limited thereto or thereby.

We claim:

1. Coupling means for connecting a driving member to a driven member, comprising:
    (a) a pair of coupling members defining a substantially annular securing chamber therebetween;
    (b) one of the pair of coupling members being connected to the driving member and the other of the pair of coupling members being connected to the driven member;
    (c) low temperature melting means disposed in the securing chamber securing the pair of coupling members to each other to provide a driving connection therebetween;
    (d) stationary housing means disposed about the coupling members defining an annular heating chamber to retain a heating fluid for melting the securing means to release the pair of coupling means from each other and disconnect the driving and the driven members;
    (e) the ends of the housing means closing the ends of the heating chamber and supporting the driving and the driven members with the coupling members connected thereto; and
    (f) means associated with the housing means for introducing heat into the heating chamber to melt the securing means for releasing the pair of coupling members from each other and disconnect the driving member from the driven member.

2. Coupling means in accordance with claim 1, and further comprising:
    (a) bearing means for reducing friction between the driving shaft with the coupling member connected thereto and the driven shaft with the coupling member connected thereto when the securing means is melted and the pair of coupling members are released from each other.

3. Coupling means in accordance with claim 1, and further comprising:
    (a) seal means operatively associated with the pair of coupling members for sealing the ends of the securing chamber when melted securing means is introduced therein and is solidifying, and movable relative to the pair of coupling members out of sealing disposition when the securing means provides a driving connection to provide escape means for melted securing means when the pair of coupling members are released from each other.

4. Coupling means for drivingly interconnecting a pair of axially aligned rotatable members and for disconnecting the rotatable members from each other, comprising:
    (a) a pair of coupling members each connected to one of the pair of rotatable members and with other of the coupling members defining an axially disposed annular securing chamber;
    (b) low temperature melting means disposed in the chamber securing the pair of coupling members to each other for providing a driving connection therebetween;
    (c) stationary housing means disposed about the coupling members defining an annular heating chamber to retain a heating fluid for melting the securing means to release the pair of coupling means from each other and disconnect the pair of rotatable members;
    (d) the ends of the housing means closing the ends of the heating chamber and supporting the pair of rotatable members and coupling members connected thereto; and
    (e) means associated with the housing means for introducing heat into the heating chamber to melt the securing means for releasing the pair of coupling members from each other and disconnect the pair of rotatable members from each other.

5. Coupling means in accordance with claim 4, and further comprising:
    (a) bearing means for reducing friction caused by rotation of one of the pair of rotatable members with the coupling member connected thereto relative to the other of the rotatable members with the coupling member connected thereto when the securing means is melted and the coupling members are released from each other.

6. Coupling means in accordance with claim 4, and further comprising:
    (a) seal means operatively associated with the pair of coupling members for sealing the ends of the securing chamber when melted securing means is introduced therein and is solidifying, and movable relative to the pair of coupling members out of sealing disposition when the securing means provides a driving connection to provide escape means for melted securing means when the pair of coupling members are released from one another.

7. Coupling means in accordance with claim 4, and:
    (a) the ends of the housing and the pair of coupling members cooperating to define enlarged annular ends of the heating chamber that extend across the ends of the securing chamber.

8. Coupling means in accordance with claim 4, wherein:
    (a) one of said pair of coupling members having an annular wall defining an axially disposed cavity;

(b) the other of said coupling members being disposed in the cavity and having an outer annular surface providing the inner wall of the securing chamber; and
(c) the annular wall having an inner annular surface spaced from the annular outer surface of the coupling member disposed in the cavity providing the outer wall of the securing chamber, and an outer annular surface spaced from the housing means providing in part the inner wall of the heating chamber.

9. Coupling means in accordance with claim 8, wherein:
(a) the low temperature melting securing means comprises one of the low temperature melting metal alloys of the group consisting of "Asarco," tin, compounds of tin, lead and antimony, Wood's alloy, and Rose's alloy.

10. Coupling means in accordance with claim 8, wherein:
(a) the low temperature melting securing means comprises one of the low temperature melting thermoplastics of the group consisting of acetal resin, polyethylene resin, polyamide resin and "Tempilstiks."

11. Coupling means in accordance with claim 8, wherein:
(a) the heating fluid comprises one of the group consisting of heated air, steam, "Zerex," "Zerone" and "Dicol."

References Cited by the Examiner
UNITED STATES PATENTS

| | | |
|---|---|---|
| 1,183,530 | 5/16 | Brennan. |
| 2,502,461 | 4/50 | Kane. |
| 2,539,534 | 1/51 | Eckhardt _____ 64—28 X |
| 2,674,358 | 4/54 | White _____ 192—82 |
| 2,942,706 | 6/60 | Mayhall et al. _____ 192—3.2 |
| 3,064,454 | 11/62 | Sharples _____ 64—28 |

DON A. WAITE, *Primary Examiner.*
ROBERT C. RIORDON, DAVID J. WILLIAMOWSKY,
*Examiners.*